(12) United States Patent
Wauke

(10) Patent No.: US 6,812,600 B2
(45) Date of Patent: Nov. 2, 2004

(54) MOTOR FOR USE WITH THIN TYPE INNER ROTOR AND DISK APPARATUS

(75) Inventor: Tomokuni Wauke, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/225,977

(22) Filed: Aug. 22, 2002

(65) Prior Publication Data

US 2003/0038561 A1 Feb. 27, 2003

(30) Foreign Application Priority Data

Aug. 24, 2001 (JP) ......................................... 2001-254918

(51) Int. Cl.[7] .............................................. H02K 1/00
(52) U.S. Cl. ........................ 310/51; 310/216; 310/193
(58) Field of Search ........................ 310/51, 216, 193, 310/254, 258, 259

(56) References Cited

U.S. PATENT DOCUMENTS

| | | | | |
|---|---|---|---|---|
| 5,004,944 A | * | 4/1991 | Fisher | 310/266 |
| 5,258,697 A | * | 11/1993 | Ford et al. | 318/498 |
| 5,432,644 A | * | 7/1995 | Tajima et al. | 360/99.04 |
| 6,384,502 B1 | * | 5/2002 | Masuzawa et al. | 310/152 |
| 6,411,002 B1 | * | 6/2002 | Smith et al. | 310/156.01 |

FOREIGN PATENT DOCUMENTS

JP          09-019123          1/1997

* cited by examiner

*Primary Examiner*—Dang Le
(74) *Attorney, Agent, or Firm*—Brinks Hofer Gilson & Lione

(57) ABSTRACT

A motor having a rotor with a plurality of magnetic poles arranged in an arch or circular shape and a stator in which coils are disposed on the magnetic teeth of a stator core having a plurality of the magnetic teeth disposed opposite to the rotor, wherein a magnetic pole part for cancelling a cogging torque is disposed around the rotor.

1 Claim, 14 Drawing Sheets

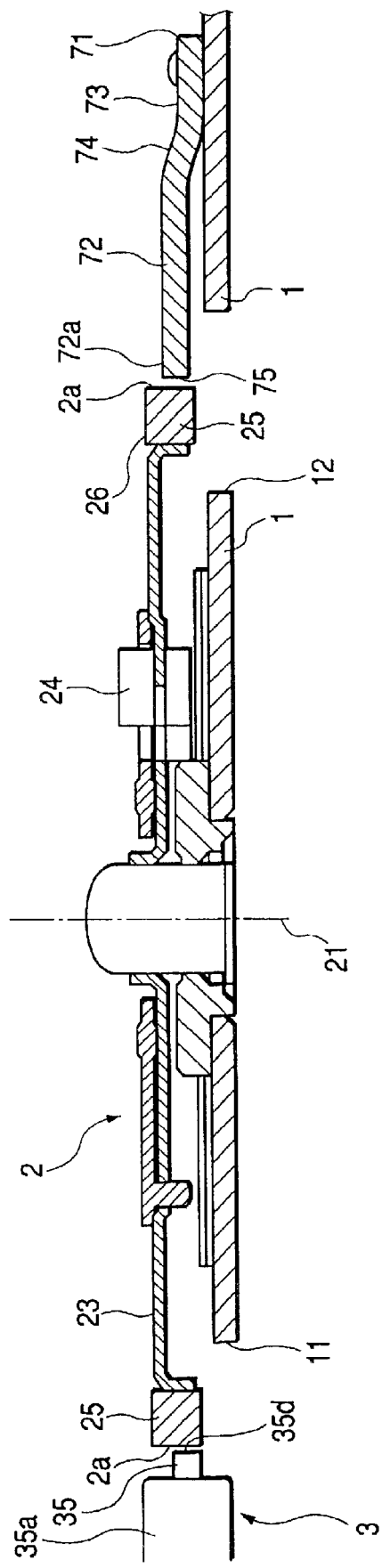
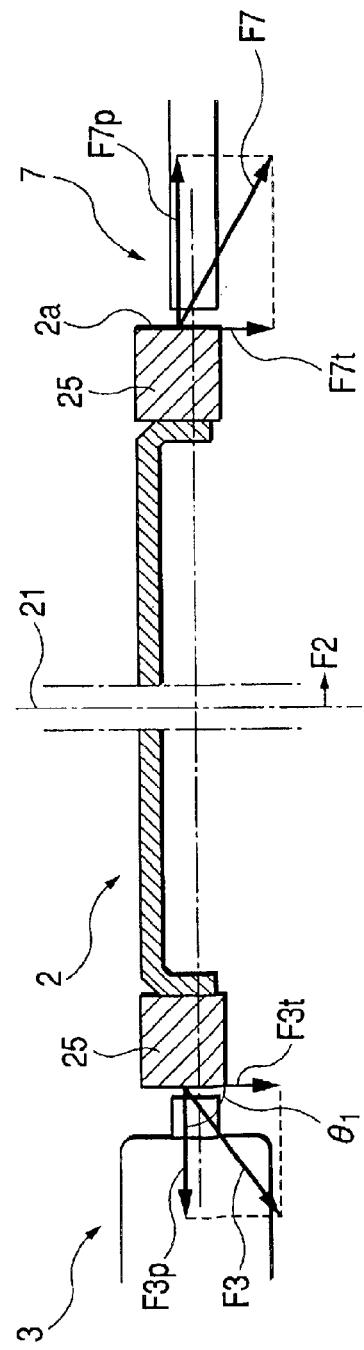
FIG. 2A
FIG. 2B

MOTOR FOR USE WITH THIN TYPE INNER ROTOR AND DISK APPARATUS

BACKGROUND OF THE INVENTION

1. Field of the Invention

This invention relates to a thin type inner rotor motor for driving rotation of a medium that can be used in a magnetic disk driving apparatus.

2. Description of the Related Art

Disk apparatuses are widely used in, for example, office computers and word processors including personal computers. One type of disk apparatus is shown in FIG. 14.

In FIG. 14, element 101 represents a chassis having a spindle center 102 as a disk rotation center, which is installed in a housing (not shown) of, for example, a personal computer. A slot is formed by a box with a bottom which is opened forward and upward and has a housing space to which a disk cartridge 103 approaches.

At a rear end of the chassis 101 are disposed a stepping motor 124 for forwarding a head carriage and a head carriage which is configured to be movable in a cross direction by the stepping motor 124. At the tip of the head carriage is held a first head 130 which reads recorded information on a disk. At a rear upper end part thereof, a head arm 132 having a second head 131 which corresponds to the first head 130 through an elastic body is mounted such that it can oscillate. This head arm 132 is biased in such a direction that the second head 131 approaches the first head 130. In the disk apparatus of this example are disposed a cartridge holder 136 which holds the disk cartridge 103 removably and a mechanism which opens and closes a shatter of the disk cartridge 103.

To reduce the thickness of this type of disk apparatus, an inner rotor motor as shown in FIG. 15 has been used as a motor for rotating a disk. The disk comprises a stator 164 having a circular yoke 161 extending in the circumferential direction and a plurality of cores 163 which are disposed on an inner peripheral surface of the yoke 161 in a radial pattern and on which coils 162 are wound. A rotor 166 is rotatably disposed in an inner peripheral part of the stator 164. A circular magnet 165 lies opposite the cores 163. In the figure, a holding part 170 that houses a bearing 169 is mounted on a circuit board 168. A rotation shaft 171 fixes the rotor which is rotatably supported by the holding part 170 on the circuit board 168 through the bearing 169 and has an axis line extending upward and downward. In addition, the rotor 166 of this inner rotor motor functions as a turntable which has a magnet (not shown) and a turning lever (not shown) for chucking a disk.

In this kind of stator for use in the inner rotor motor, the yoke 161 and cores 163 are disposed to surround nearly the entire circumference of the round shaped rotor 166 except for a movement zone of the heads 130 and 131, and are made for example, of silicon steel which is expensive compared to galvanized sheet iron which forms the chassis 101.

Presently, there exists a demand to reduce manufacturing cost and a strong demand to reduce the size and weight of disk apparatuses. Therefore, there is a demand to reduce the areas of the yoke 161 and cores 163, which are made of expensive silicon steel, in the stator used in the inner rotor motor.

However, if the yoke 161 and the cores 163 are reduced, the magnetic interaction with the rotor 166 becomes uneven along a circumferential direction so cogging torque was often generated. Cogging torque triggers defects such as a reduction in the torque of the rotor 166, rotational irregularity of the rotor 166, and increase of control currents for compensating the rotational irregularity. Thus, the cogging torque has to be reduced as much as possible.

Cogging torque will be described with reference to a schematic diagram of a motor shown in FIG. 16. In FIG. 16, 501 represents a circular magnet rotor magnetized with multipoles and 502 represents a stator core having three magnetic teeth 502a to 502c. Coils 502d are wound on the respective magnetic teeth 502a to 502c.

In FIG. 16, magnetic fluxes pass from an N pole near the magnetic teeth 502a toward an S pole near the magnetic teeth 502b. Magnetic fluxes pass from an N pole near the magnetic teeth 502c toward an S pole near the magnetic teeth 502a and 502b, respectively. When the total number of magnetic fluxes of N poles and S poles in the stator core 502 are made equal, cogging torque is reduced.

However, in an actual motor, due to, for example, magnetization irregularity of a magnet, dimensional accuracy of respective components and influence of a magnetic body disposed around the magnet, the total number of magnetic fluxes of N poles and S poles are not equal so cogging torque was often generated.

SUMMARY OF THE INVENTION

The present invention provides a motor that can reduce cogging torque and maintain rotation stability.

The invention employs the following structure.

A motor of the invention comprises a rotor having a plurality of magnetic poles disposed in an arch or circular shape, and a stator in which coils are disposed on respective magnetic teeth of a stator core having a plurality of the magnetic teeth disposed outside or inside of the circumference and opposite the rotor, wherein a magnetic pole part for cancelling cogging torque is disposed around the rotor.

Since the magnetic pole part for cancelling cogging torque is disposed around the rotor, the cogging torque of the motor can be canceled because of the magnetic interaction between the magnetic pole part and the rotor.

Further, the stator is disposed at an outer peripheral side of the rotor covering a range of within about 180° relative to a center angle of the rotor. The magnetic pole part is disposed at an opposite side to the stator by sandwiching a center of the rotor.

According to such a motor, since the magnetic pole part is disposed at the opposite side to the stator by sandwiching the center of the rotor, the magnetic pole part doe not interfere with the magnetic interaction between the rotor and the stator. Thus, it becomes possible to configure a motor which reduces rotation irregularity.

Furthermore, the rotor is supported rotatably on a surface of a base made of a ferromagnetic material through a rotation axis. A tip of the magnetic teeth of the stator is disposed at a position from which is viewed a cutting portion disposed on the surface of the base and which is opposite the outer peripheral surface of the rotor. A tip of the magnetic pole part is disposed at a position from which is viewed another cutting portion disposed on the surface of the base and which is opposite the outer peripheral surface of the rotor.

According to such a motor, since the tip of the magnetic teeth and the tip of the magnetic pole part are disposed at a position from which is viewed the cutting portion of the base, at a portion where the magnetic teeth and the magnetic pole part are located, magnetic fluxes from the rotor affect only the magnetic teeth and the magnetic pole part and do not affect the base. Therefore, the generation of cogging torque due to the operation of the base and the rotor can be reduced.

Moreover, in the motor of the invention, the magnetic pole part is plate-shaped. An end face which is located at the tip of the magnetic pole part is made to be a curved surface along the outer peripheral surface of the rotor.

According to such a motor, since the end face of the platy magnetic pole part is made to be a curved surface along the outer peripheral surface of the rotor, magnetic fluxes from the rotor can be effectively applied to the magnetic pole part so cogging torque can be reduced.

Further, in the motor of the invention, a center position in a thickness direction of the tip of the magnetic teeth and a center position in a thickness direction of the end face of the magnetic pole are disposed at an identical position along the rotor's rotation axis.

According to such a motor, since the magnetic teeth and the magnetic pole part are disposed at an identical position along the rotor's rotation axis, the rotor is not inclined to the rotation axis so the rotor can stably rotate.

The disk apparatus of the invention can be used with any of the motors described above for use in driving the rotation of a disk.

BRIEF DESCRIPTION OF THE DRAWINGS

The invention may best be understood by reference to the description below in conjunction with the following drawings:

FIG. 2A is a sectional view showing section 2—2 of the inner rotor motor shown in FIG. 1.

FIG. 2B is an enlarged sectional view showing the vicinity of a magnet part 25 shown in FIG. 2A.

DESCRIPTION OF THE PREFERRED EMBODIMENTS

Figure 1:
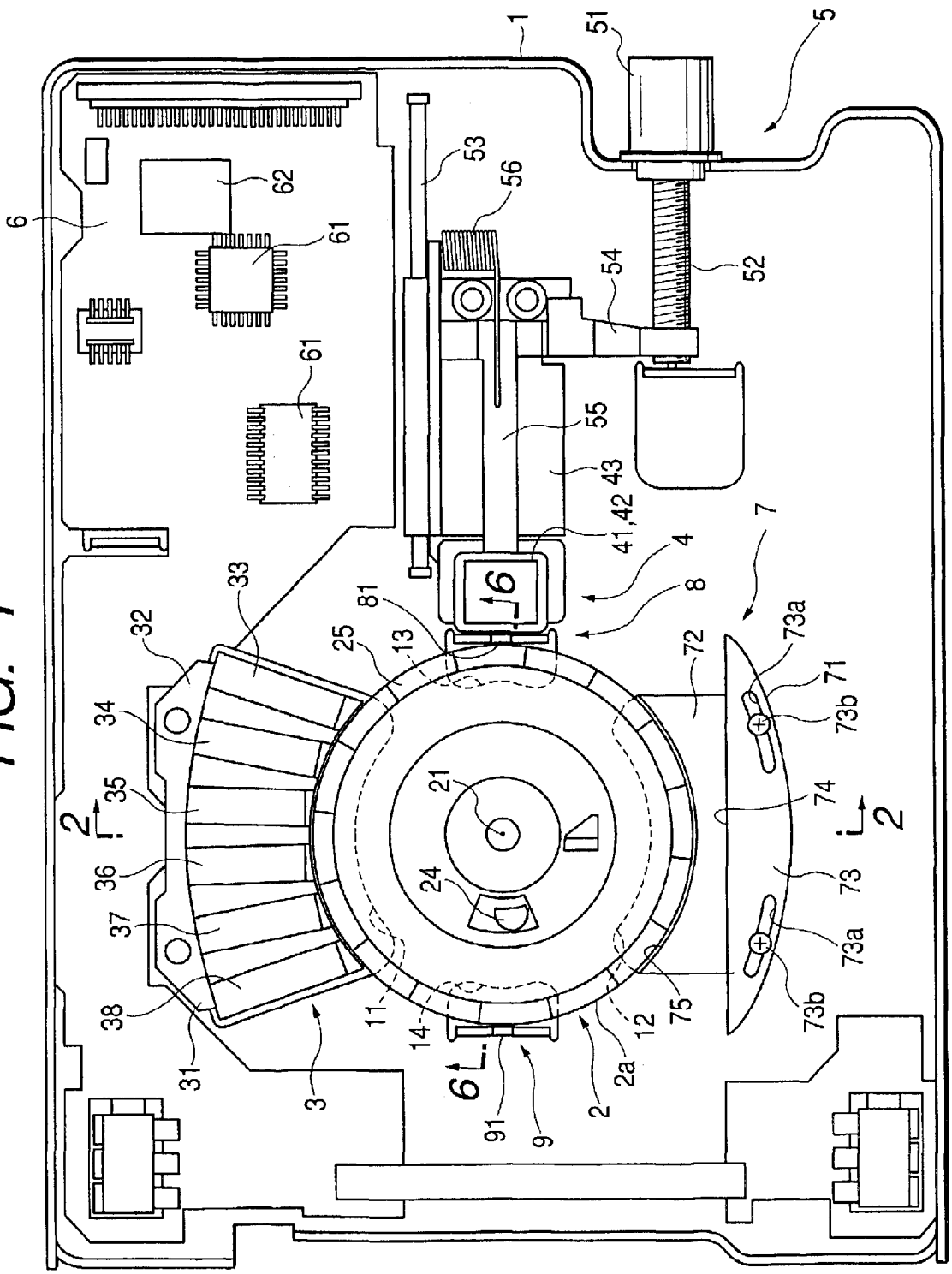
FIG. 1 is a first embodiment of the invention that shows a view of a disk apparatus that has an inner rotor motor.

FIG. 1 is a view showing a part of a disk apparatus according to the first embodiment. Part or component 1 represents a chassis (base) that forms part of a housing of the disk apparatus.

On the chassis (base) 1, which is made of a ferromagnetic material such as galvanized sheet iron, are disposed a rotor 2 and a stator 3 in an inner rotor motor (motor) for rotating a magnetic recording medium (disk), a magnetic head part 4 for reading and writing magnetic signals from and into the disk, a position control part 5 for carrying out position control of the magnetic head part 4, a substrate 6 as a control part for carrying out driving control of the position control part 5 and the inner rotor motor, a ferromagnetic plate 71 as a platy magnetic pole part 7, a magnetic shield 8, and a magnetic balancer 9.

FIG. 2A is a sectional view showing section 2—2 of the inner rotor motor shown in FIG. 1. FIG. 2B is an enlarged sectional view showing the vicinity of a magnet part 25 in FIG. 2A.

Rotor 2 comprises, as shown in FIGS. 1 and 2, a circular disk part 23, which is rotatably supported on a spindle center 21 fixed to a bottom surface of the chassis 1 as a rotation center along a surface which is parallel to the bottom surface of the chassis 1, an engaging protruded part 24, which protrudes on a top surface of the circular disk part 23 and transmits a rotational driving force by being engaged with an engaging hole of the magnetic disk, and a magnet part 25 which is disposed at an edge part of the circular disk part 23, wherein a plurality of magnetic poles are formed with an arch or circular shape.

Figure 5:
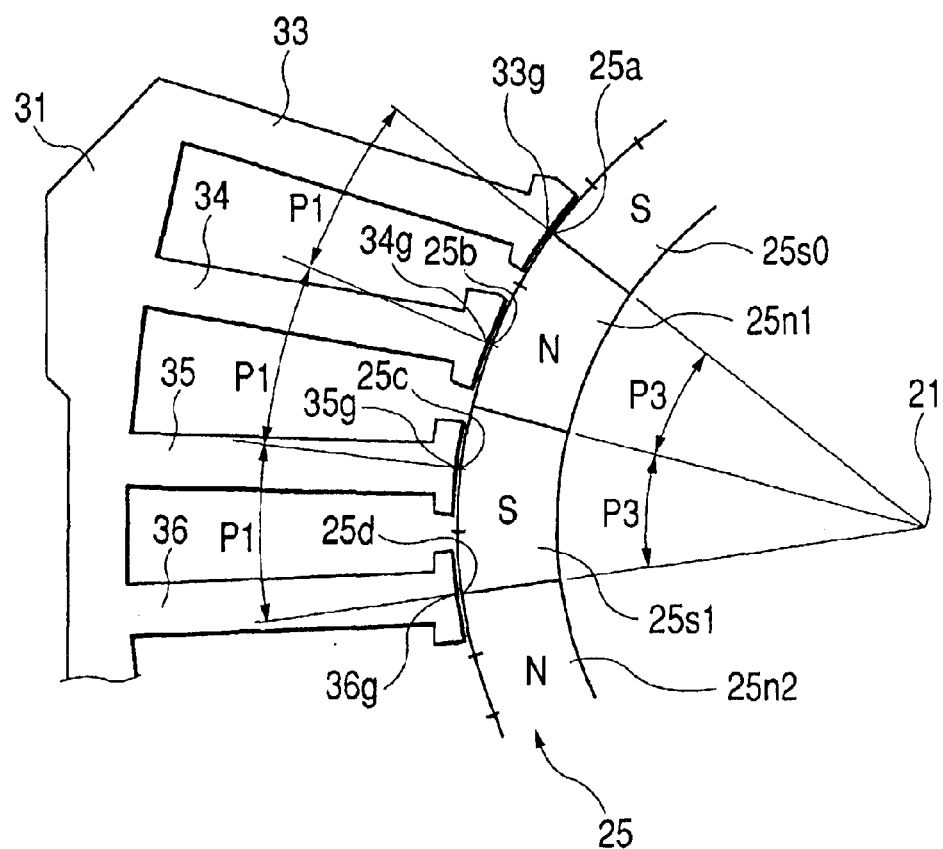
FIG. 5 is a patterned view showing relation the of the magnet part 25 and magnetic teeth 33 to 38 shown in FIG. 1.

In the magnet part 25, as shown in FIGS. 1 and 5, an N pole and an S pole are arranged alternately in the circumferential direction. The total number of these magnetic poles can be, for example, 16. That is, relative to the rotation center 21, magnetic poles 25n, 25s . . . are disposed alternately at angles of 22.5°.

Figure 3:
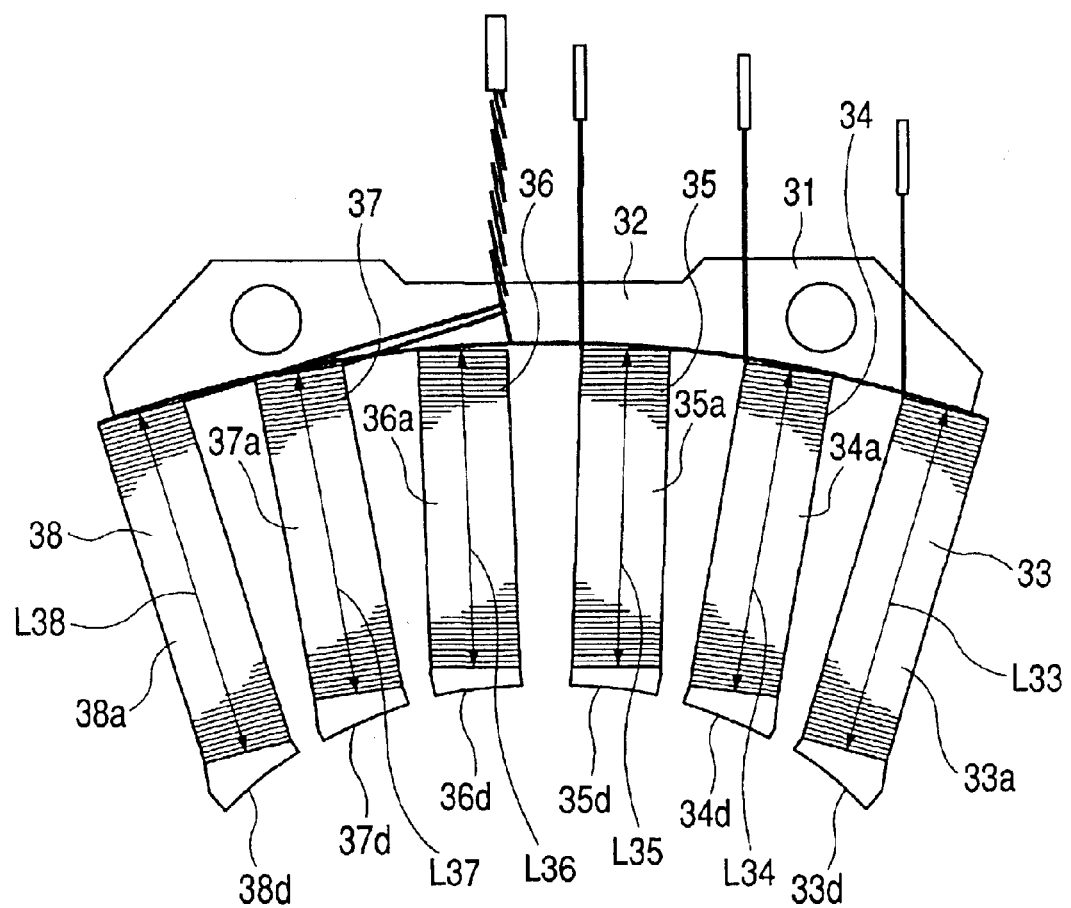
FIG. 3 is a magnified view showing a stator 3 shown in FIG. 1.

FIG. 3 is a magnified view showing the stator 3 shown in FIG. 1. The stator 3 is configured in such a manner that on a stator core 31, which comprises a yoke part 32 and six magnetic teeth 33, 34, 35, 36, 37 and 38 connected by the yoke part 32, coils 33a to 38a are formed by applying windings on the respective magnetic teeth 33 to 38. The stator 3 is mounted on the chassis 1 by the yoke part 32. The coils 33a to 38a and tip parts 33b to 38b of the magnetic teeth are located at a position from which is viewed a cutting part 11 of the chassis 1 which is disposed from a rotation downside position of the rotor 2 to a side direction thereof.

The cutting part 11 is disposed from a position at which the stator core 31 is mounted on the chassis 1 to a rotation position downward of the magnet part 25 of the rotor 2 in such a shape that coils 33a to 38a can be accommodated therein. Here, the shape of this cutting part 11 is, from the physical relationship to cutting parts 12, 13 and 14 described later, set to an extent that coils 33a to 38a can be accommodated based on the strength of the chassis 1.

Figure 4:
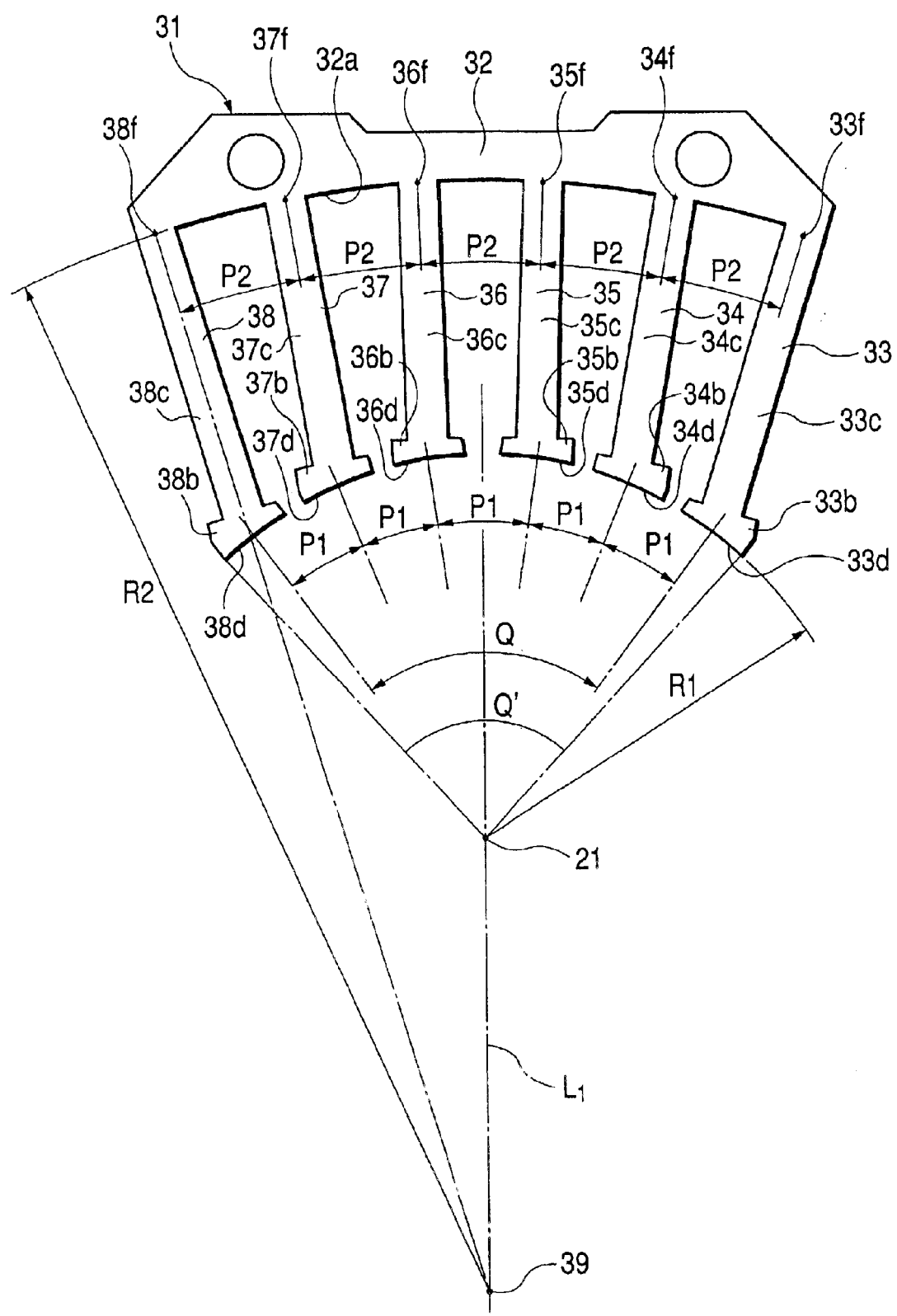
FIG. 4 is a magnified view showing a stator core 31 shown in FIG. 1.

FIG. 4 is a magnified view showing the stator core 31 shown in FIG. 1.

The stator core 31 is made of silicon steel. As shown in FIGS. 1 to 4, on the respective magnetic teeth 33 to 38 are disposed the tip parts 33b to 38b which are disposed to extend to the rotor 2 side than the coils 33a to 38b, respectively, and respective winding parts 33c to 38c on which coils 33a to 38a are formed.

The respective winding parts 33c to 38c have uniform width over the whole length. The respective tip parts 33b to 38b are formed wider than the respective winding parts 33c to 38c. The tip parts 33b to 38c are disposed in the shape of circular arc looking on a plane in such a manner that rotor facing surfaces 33d to 38d are opposite the magnet part 25 of the rotor 2 with an approximately equal spacing.

The stator core 31 is configured such that the tip parts 33b to 38b are disposed, as shown in FIG. 2, at lower positions compared with the magnet part 25 of the rotor 2. That is, a center position in a height direction (along the rotation axis of rotor 2) of the tip parts 33b to 38b is located at the bottom surface side of the chassis 1 lower than a center position in a height direction of the magnet part 25. At the same time, coils 33a to 38a are positioned inside of the cutting part 11 of the chassis 1.

As shown in FIG. 4, the respective magnetic teeth 33 to 38 are, as shown in FIG. 4, configured in such a manner that the rotor facing surfaces 33d to 38d at tips of the teeth are set to be of a circular or arch shape with R1 as a radius to be of equal distance to a position at which the rotor facing surfaces 33d to 38d coincide with the rotation center 21 of the rotor 2. Further, respective pitches P1 in the circumferential direction of the rotor facing surfaces 33d to 38d are set to be equal. The pitch P1 of the rotor facing surfaces 33d to 38d is one in which a spacing between circumferential direction center positions 33g to 38g of the adjacent rotor facing surfaces 33d to 38d is represented by an angle on the rotation center 21, and the pitch P1 is set to be, for example, about 15°.

Here, a value Q, in which the spacing between circumferential direction center positions of the rotor facing surfaces 33d and 38d at both ends is represented by an angle, equal to about 75° as a center angle to the position which coincides with the rotation center 21 of the rotor 2.

As shown in FIG. 4, in the yoke part 32, a side of the respective magnetic teeth 33 to 38 to be connected, i.e., a surface 32a at a side opposite rotor 2 is set to form an arch or circular shape on a plane. This surface 32a is formed to have a circular or arch shape with a radius R2 around a center of a point 39 which is located farther away from the stator 3 than the rotation center 21 of the rotor 2. At the same time, rear anchor centers 33f and 38f of the magnetic teeth 33 and 38 which are connected to this surface 32a are set at positions with equal distances from the rotation center 21, respectively. Further, the rear anchor centers 34f and 37f of the magnetic teeth 34 and 37 are set at positions with equal distances from the rotation center 21, respectively. Thus, the shape of the stator core 31 is set to be in line symmetry to a straight line L1 which passes through the rotation center 21 and the point 39.

Further, in the respective magnetic teeth 33 to 38, as shown in FIG. 4, respective pitches P2 of their rear anchor centers 33f to 38f are set to be equal. The pitch P2 of the rear anchor centers 33f to 38f is one in which a spacing between circumferential direction center positions along the surface 32a at the rear anchors of the adjacent magnetic teeth 33 to 38 is represented by an angle at the point 39. The pitch P2 of the rear anchor centers 33f to 38f is set to a value smaller than that of the pitch P1, for example, about 7°.

Here, the pitch P2 is set to be such that at least one angle formed by extending directions of the adjacent magnetic teeth 33 to 38 is smaller than an angle formed by straight lines formed by joining the rotor facing surfaces 33d to 38d of the adjacent magnetic teeth 33 to 38 and the rotation center 21 of the rotor 2. That is, in the respective magnetic teeth 33 to 38, at least one angle at the point 39 where are crossed extended straight lines formed by joining the rear anchor centers 33f to 38f. The circumferential direction center positions 33g to 38g of the rotor facing surfaces 33d to 38d is smaller than the angle P1 formed by lines formed by joining the circumferential direction center positions 33g to 38g of the rotor facing surfaces 33d to 38d and the rotation center 21.

Further, in the respective magnetic teeth 33 to 38, the respective winding parts 33c to 38c with an equal width in the extending direction thereof are disposed, as shown in FIG. 4, to be located on a straight line which passes through the respective rear anchor centers 33f to 38f and the point 39. The figure shows a relation of the winding part 38c in the magnetic teeth 38 and a straight line which passes through the rear anchor center 38f and the point 39.

By setting the pitches P1 and P2 in this manner, lengths L33 to L35 and L36 to L38 of the winding parts 33c to 38c in the respective magnetic teeth 33 to 38 are set to be different from one another. That is, as shown in FIGS. 3 and 4, supposing that the length of the winding parts 33c to 38c are L33 to L38, respectively, it is set to be L33=L38>L34=L37>L35=L36.

In the coils 33a to 38a, the number of turns N33 to N35 and N36 to N38 of the respective windings are set to be, respectively, $$N33=N38 \geq N34=N37 \geq N35=N36.$$

Further, in the respective coils 33a to 38a, corresponding to the rotor 2 which is configured by 16 poles, the wire connection is carried out corresponding to three phases (U phase, V phase and W phase), and coil 33a is set to be the U phase, coil 34a is set to be the W phase, coil 35a is set to be the V phase, coil 36a is set to be the U phase, coil 37a is set to be the W phase, and coil 38a is set to be the V phase.

A sum Nu of the winding number of the U phase is N33+N36, a sum Nv of the winding number of the V phase is N35+N38, a sum Nw of the winding number of the W phase is N34+N37, which are set equal, that is, set to be Nu=Nw=Nv. In this way, it becomes possible to set a torque equal to rotor 2 in the three phases (U phase, V phase and W phase).

In the above described structure, the stator 3 may be located on one side of rotor 2, i.e., within an area where the center angle Q is within about 180° to the point which coincides with the rotation center 21 of rotor 2 and located within an area of about 90°.

In this manner, by setting a center angle of the stator 3 to be within about 180°, compared with a case where the stator 3 is disposed on the entire circumference of the rotor 2, an area of the stator core looking on a plane can be reduced to within an approximately half value. Further, by setting a center angle of the stator 3 to be within about 90°, the area of the stator core can be further reduced.

FIG. 5 is a view showing the relation of the magnet part 25 and the magnetic teeth 33 to 38 in FIG. 1.

As shown in FIG. 5, the stator 3 and the rotor 2 are, as shown in FIG. 5, located such that the rotor facing surfaces 33d to 38d are opposite rotor 2, and the relation of the respective magnetic teeth 33 to 38 and the magnet part 25 are made as follows.

In the circumferential direction of rotor 2, the respective magnetic poles 25n, 25s ... are disposed in such a state that a pitch is set to about 22.5° to the rotation center 21. This pitch is represented by P3 in FIG. 5. On the other hand, as described above, the pitch P1 of the rotor facing surfaces 33d to 38d in the circumferential direction is set to, for example, about 15°. That is, to the respective magnetic poles 25n, 25s ... of the rotor 2, for example, half of the magnetic teeth 33 and 34 of 1, i.e., 1.5 pieces among the respective magnetic teeth 33 to 38 correspond thereto. In the figure, the magnetic teeth 37 and 38 are omitted.

As shown in FIG. 5, the arrangement of the respective magnetic poles in the stator 3 and the rotor 2 is carried out such that, in case that the circumferential direction center position 33g of the rotor facing surface 33d of the magnetic teeth 33 is located at a position opposite a boundary position 25a of the magnetic poles 25s0 and 25n1, the circumferential direction center position 34 of the rotor facing surface 34d of the magnetic teeth 34 located adjacent thereto is disposed at a position opposite a second position 25b from the magnetic pole 23s0 side when the pitch P3 of the magnetic pole 25n1 is divided into three pieces in the circumferential direction. At the same time, the circumferential direction center position 35g of the rotor facing surface 35d of the next magnetic teeth 35 is set at a position opposite a first position 25c from the magnetic pole 25n1 side when the pitch P3 of the magnetic pole 25s1 is divided into three pieces in the circumferential direction. Further, the circumferential direction center position 36g of the rotor facing surface 36d of the magnetic teeth 36 is set at a position opposite a boundary position 25d of the next magnetic pole 25s1 and magnetic pole 25n2.

In this inner rotor motor, the respective magnetic teeth 33 to 38 is set to be the U phase, the V phase or the W phase, with a phase difference of an electrical angle of about 120°. For example, coil 33a is set to be the U phase, coil 34a is set to be the W phase, coil 35a is set to be the V phase, coil 36a is set to be the U phase, coil 37a is set to be the W phase, coil 38a is set to be the V phase. Further, the pitch P1 between the magnetic teeth 33 to 38 is set to be, for example, about 15°.

Accordingly, for example, if the magnetic teeth are disposed on the entire circumference around the rotor 2 by pitch P1, the stator is made to be of 24 poles. Therefore, in this embodiment, the number of the magnetic teeth which are located per unit angle in a center angle to the rotation center 21 is set to be greater than the number of the magnetic poles of the rotor 2. That is, an angle density of the magnetic teeth 33 to 38 to the center angle of the rotation center 21 is set larger than that of the magnetic poles 25n and 25s of the rotor 2.

Thus, in the embodiment, by disposing the respective magnetic teeth 33 to 38 on a straight line which passes through the point 39 located farther away from the stator 3 than the rotation center 21, a length of the yoke part in the circumferential direction can be made smaller, an area of the yoke part looking on a plane can be reduced, and an area of the stator core 31 can be reduced.

As shown in FIGS. 1 and 2A, at a position opposite the stator 3 formed by sandwiching the rotation center 21 of the rotor 2, is disposed a ferromagnetic plate 71 as a ferromagnetic part 7 for cancelling cogging torque.

As to the ferromagnetic plate 71, as shown in FIGS. 1 and 2A, a tip part 72 thereof is located at a position from which is viewed the cutting part 12 disposed at a rotation downward of the rotor 2 of the chassis 1. A rear anchor part 73 is fixed by a screw to the bottom surface of the chassis 1, and a position to the rotor 2 can be finely adjusted. That is, in the rear anchor part 73, long holes 73a and 73a are formed, and screws 73b and 73b are inserted into these long holes 73a and 73a so that the rear anchor part 73 is fixed to the chassis 1 in such a state that the rear anchor part 73 can be finely adjusted.

Further, a clinched part 74 is disposed between the tip part 72 and the rear anchor part 73. By this clinched part 74, the tip part 72 is separated from the surface of the chassis 1, whereby the tip part 72 is disposed at a position opposite the outer peripheral surface 2a of rotor 2.

Furthermore, a rotor facing surface (end face) 75 of the ferromagnetic plate 71 is made to be a curved surface along the outer peripheral surface 2a of rotor 2.

In particular, the rotor facing surface 75 is set to be of a circular or arch shape with a radius R1' such that it is made to be of an equal distance to a point 21 which coincides with the rotation center of rotor 2. This radius R1' is set equal to or larger than radius R1 which is set to the rotor facing surfaces 33d to 38d.

Moreover, a length of the rotor facing surface 75 of the ferromagnetic plate 71 in the circumferential direction has a length such that the cogging torque generated when rotor 2 is rotated is minimized.

Cogging torque of the motor can be generated in case that the magnetic fluxes of the magnetic poles 25n, 25s, ... of the magnet part 25 get into the chassis 1 located among the magnetic teeth 33 to 38, the magnetic shield 8, the magnetic balancer 9 and the cutting parts 11, 12, ... This is because presumably a magnetic potential is minimized whereby the cogging torque increases when the number of magnetic fluxes of N and S which get into the magnetic teeth 33 to 38, the magnetic shield 8, the magnetic balancer 9 and the chassis 1 are made equal.

Here, by newly adding the ferromagnetic plate 71 as the magnetic pole part 7, the magnetic fluxes due to the magnetic poles 25n, 25s ... get also into the ferromagnetic plate 71, and a magnetic potential increases so that cogging torque is reduced. The number of magnetic fluxes that gets into the ferromagnetic plate 71 can be adjusted by changing the length of the rotor facing surface 75 of the ferromagnetic plate 71.

In this manner, by adding the ferromagnetic plate 71 and adjusting the length of the rotor facing surface 75, the number of respective magnetic fluxes of N and S which get into the magnetic teeth 33 to 38, the magnetic shield 8, the magnetic balancer 9 and the chassis 1, as well as the ferromagnetic plate 71, is made different so that the cogging torque can be reduced.

The length of the rotor facing surface 75 of the ferromagnetic plate 71 in the circumferential direction is, as described above, set to a length that will minimize the cogging torque generated when rotor 2 is rotated.

Figure 7:
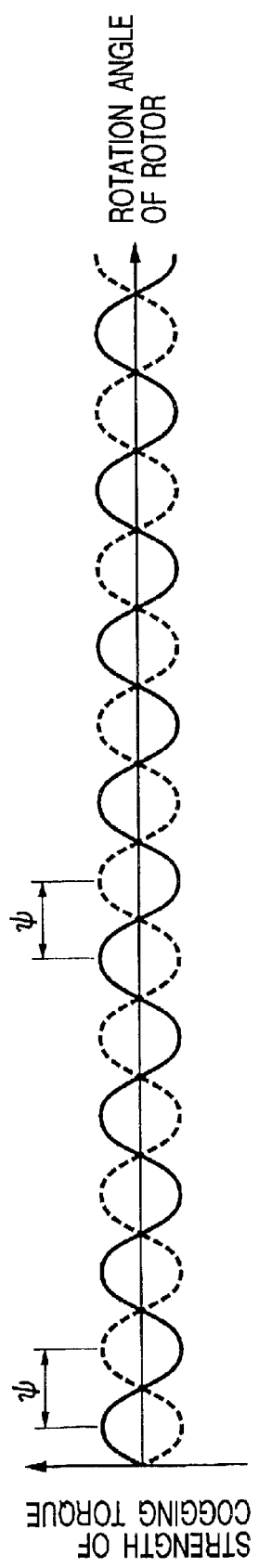
FIG. 7 is a graph showing the relation of cogging torque strength and rotation angle of a rotor.

FIG. 7 shows a relation of a strength of the cogging torque and a rotation angle of the rotor 2. In FIG. 7, solid line curve shows the cogging torque when the magnetic pole part 7 is not mounted. On the other hand, the dotted line curve shows the cogging torque generated between the magnetic pole part 7 and the rotor 2. These two curves become sine wave curves having an almost equal period and magnitude, and are out-of-phase. Supposing that a phase difference at this time is ψ as shown in FIG. 7, ψ is preferably set equal to about ±180° in order to reduce the cogging torque.

In case that the phase difference ψ is set to fall within the above range, the cogging torque (solid line), when the magnetic pole part 7 is not mounted, is canceled by the cogging torque (dotted line) by the magnetic part 7 and the rotor 2 to be a standing wave so that the cogging torque is minimized.

Further, by fine adjusting the position of the ferromagnetic plate 71 to the rotor 2 by the screw 73*b* and the long hole 73*a*, it is possible to control a position where the magnetic fluxes get into the ferromagnetic plate 7, and thus reduce the cogging torque.

In addition, the ferromagnetic plate 71 functions as a magnetic balancer to maintain magnetic balance to the stator 3. That is, by adjusting a position and a shape of the ferromagnetic plate 71, the magnetic influence from the stator 3 to the rotor 2 is balanced, and the magnetic balance to the rotor 2 is able to maintain a symmetrical state to the rotation center 21.

As shown in FIG. 2B by a dashed line which crosses another dashed line 21, a center position in a thickness direction of the rotor facing surface 35*d* at the tip of the magnetic teeth 35, and a center position in a thickness direction of the rotor facing surface 75 which is an end face of the magnetic plate 71, are set to be identical. Thus, the rotor 2 is not inclined towards the rotation axis of the rotor 2 so it becomes possible to stably rotate rotor 2.

Further, as shown in FIG. 2B, the tip part 72 of the ferromagnetic plate 71 is located at a position lower than a center of thickness of rotor 2. In other words, a center position in a thickness direction of the rotor facing surface 75 of tip part 72 is disposed at a position lower relative to a center position in a rotation axis direction of the magnet part 25 of the rotor 2. Then, the tip part 72 is set to be of an approximately uniform thickness and is at a position lower than the top surface 26 of the magnet part 25 of rotor 2. Alternatively, the top surface 72*a* of the tip part 72 is, as shown in FIG. 2, set closer to the bottom surface of the chassis 1 than the top surface 26 of the magnet part 25 of rotor 2.

The height of this tip part 72, i.e., the difference between the top surface 72*a* of the tip part 72 and the top surface 26 of the magnet part 25, is set such that at the same time of setting a value of misalignment of center positions in a height direction of the tip parts 33*b* to 38*b* and the magnet part 25, a minimum and downward thrust load is secured to maintain rotation stability of the rotor 2, and a load in radiating directions from the rotation center 21 of the rotor 2 increases.

As shown in FIG. 2B, a force F3 is applied between rotor 2 and the stator 3. At the same time, a force F7 is applied between rotor 2 and the ferromagnetic plate 71 (magnetic pole part 7). This force F3 is applied inclined to the bottom surface side of the chassis 1 from a rotation plane of rotor 2.

In rotor 2, the force F3 is operated in the direction of the tip parts 33*b* to 38*b* disposed at a lower position compared with the magnet part 25 of rotor 2. Further, this force F7 is applied inclined to the bottom surface side of the chassis 1 from the rotation plane of the rotor 2. This is because the force F3 is applied to rotor 2 in the direction of the ferromagnetic plate 71 disposed at a lower position compared with the magnet part 25 of the rotor 2.

Here, as shown in FIGS. 2A and 2B, the following equations are satisfied:

F3t=F3 cos θ1 (vertical direction component of F3)

F7t=F7 cos θ2 (vertical direction component of F7)

Thus, the forces F3 and F7 give a thrust force to the rotor 2 to stabilize the rotation of the rotor 2 through the combined force F3t and force F7t in the rotation axis direction of the rotor 2. That is, rotor 2 is pressed downward from its peripheral part to the bottom surface of the chassis 1.

At this time, the magnetic fluxes from the magnet part 25 get into the bottom surface of the chassis 1, between the cutting parts 11 and 14, between the cutting parts 14 and 12, between the cutting parts 12 and 13, and between the cutting parts 13 and 11, respectively, whereby the downward thrust force is applied to rotor 2.

The forces F3 and F7 are set so that the rotation of rotor 2 is stabilized and a driving characteristic is not blocked by the influence of friction due to an increase of the thrust force at the rotation axis of the rotor 2.

At the same time, as to these forces F3 and F7, the force F7*p* is set larger than the force F3*p* in a direction perpendicular to the rotation axis of the rotor 2, i.e., in a direction parallel to the bottom part of the chassis 1. As shown in FIG. 2B, the leftward force F3*b* is set smaller than the rightward force F7*p*. Thus, the rightward force F2 shown in FIG. 2B, i.e., a force toward the side of the magnetic pole part 7 from the side of the stator 3, is applied to the rotation axis 21 of rotor 2 and stabilizes the rotation axis of rotor 2.

As stated above, as parameters for setting the forces F3 and F7, the followings are considered.

Area of the rotor facing surfaces 33*d* to 38*d*.

Distance between the rotor facing surfaces 33*d* to 38*d* and the outer peripheral surface 2*a* of the rotor 2.

Height position between the rotor facing surfaces 33*d* to 38*d* and the magnet part 25.

Area of the rotor facing surface 71*a*.

Distance between the rotor facing surface 71*a* and the outer peripheral surface 2*a* of the rotor 2.

Height position between the rotor facing surface 71*a* and the magnet part 25.

Combining and setting these parameters lead to an optimum state.

As shown in FIG. 1, the magnetic head part 4 comprises a first head 41 and a second head 42 disposed opposite each other above and below to read and write magnetic signals from and in the disk. They are mounted on a head carriage 43. These first head 41 and second head 42 are position controlled by the position control part 5.

Further, as shown in FIG. 1, the position control part 5 has a stepping motor 51 for use in forwarding the head carriage 43. This stepping motor 51 is held at a rear center part of the chassis 1 and configured as a driving source for driving the head carriage 43 in a cross direction. An output axis of this stepping motor 51 is formed by a lead screw bar 52 which has a helical V-shaped groove and is extended in the cross direction. A tip part thereof is supported by a bearing. A guide bar 53 is disposed in parallel with the lead screw bar 52. The guide bar 53 is held at the rear center part of the chassis 1 and guides the head carriage 43, which will be described later.

The head carriage 43 has a needle pin 54 protruding obliquely rearward and a leaf spring which presses this needle pin 54 to the inside of the V-shaped groove of the lead screw bar 52. The guide bar 53 is inserted into the head carriage 43 so the carriage can be moved forward and backward. The carriage 43 is disposed above the chassis 1. At a tip part of this head carriage 43, a magnetic head 41 for reading recorded information on the disk is held. At a rear upper end part thereof, which is mounted to be able to oscillate, is a head arm 55 having a magnetic head 42 corresponding to the magnetic head 41 through an elastic body. This head arm 55 is biased so it can be turned by a torsion spring 56 towards a direction such that the magnetic head 42 approaches the magnetic head 41. At one side edge thereof is integrally disposed a stopper protruding toward a side direction for controlling the turn of the arm.

On substrate 6 are disposed the position control part 5, chips 61 and 61, and a capacitor 62 as the control part which controls the driving of the inner rotor motor.

At the side of the magnetic head part 4 of the rotor 2 is disposed the magnetic shield part 8 which blocks off the magnetic fluxes from the magnet part 25 to the magnetic heads 41 and 42.

Figure 6:
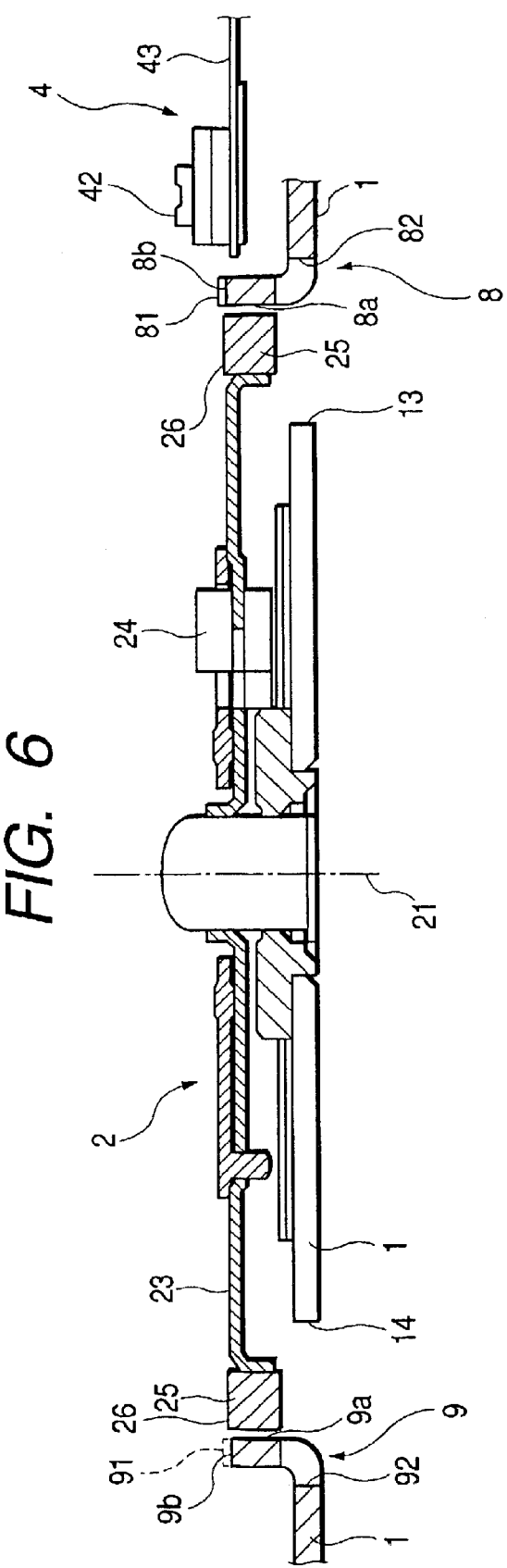
FIG. 6 is a sectional view showing 6—6 section of a magnetic shield of the inner rotor motor shown in FIG. 1.

FIG. 6 is a sectional view showing section 6—6 of the magnetic shield of the inner rotor motor shown in FIG. 1.

The magnetic shield 8 is disposed, as shown in FIGS. 1 and 6, around the rotation position of rotor 2 such that it contacts with the cutting part 13, which is disposed at a rotation downward of rotor 2 on the chassis 1, is integrated with the bottom surface of the chassis 1, gets up erectly from the bottom surface of the chassis 1, is opposite the circumferential surface of the magnet part 25 of the rotor 2.

The magnetic shield 8 is configured as a straight line shape looking on a plane, and its length is set so that when looking at rotor 2 from the magnetic head 42, the magnet part 25 of rotor 2 is hidden from view. That is, the length may be sufficient to block off the magnetic fluxes from the magnet part 215 so the operation of the magnetic heads 41 and 42 is not affected.

A top end 8b of the magnetic shield 8 is, as shown in FIG. 6, set to be on almost the same plane as the top surface 26 of the magnet part 25 of the rotor 2. Here, the rotor facing surface 8a is set such that a dimension in its height direction is about equal to that in the height direction of the magnet part 25. Thus, the magnetic fluxes from the magnet part 25 are blocked off, and it is possible to prevent the magnetic fluxes from the magnet part 25 from affecting the operation of the magnetic head 42. The shape of the magnetic shield 8 is set to hitch the magnet part 25 only in a horizontal direction, and a vertical load which is applied to the rotor is reduced.

By setting a shape of this portion, it also becomes possible to set the vertical load applied to the rotor 2.

At a position opposite the magnetic shield 8 by sandwiching rotor 2 is disposed the magnetic balancer 9 for maintaining magnetic balance with the magnetic shield 8 to rotor 2.

The magnetic balancer 9 is disposed, as shown in FIGS. 1 and 6, around the rotation position of the rotor 2 such that it contacts with the cutting part 14, which is disposed at a rotation downward of rotor 2 on the chassis 1, is integrated with the bottom surface of the chassis 1, rises erectly from the bottom surface of the chassis 1, and is opposite the circumferential surface of the magnet part 25 of the rotor 2.

The magnetic balancer 9 is formed corresponding to the magnetic shield 8 and allocated to be symmetrical about a point with the magnetic shield 8 to the rotation center 21 of the rotor. That is, the magnetic balancer 9 is configured to be straight and its length set equal to the magnetic shield 8. A position facing the magnet part 25 of rotor 2 is positioned to come close to rotor 2 at a center portion as in the magnetic shield 8. The distance between the rotor facing surface 9a and the magnet part 25 is long at both ends of the magnetic balancer 9 and minimum at a center portion thereof.

A top end 9b of the magnetic balancer 9 is set, as shown in FIG. 6, such that it is on the same surface as the top surface 26 of the magnet part 25 of the rotor 2. The rotor facing surface 9a is set, in the same manner as the rotor facing surface 8a of the magnetic shield 8, such that a dimension in its height direction is set equal to or larger than that in a height direction of the magnet part 25.

Furthermore, on the chassis 1 at a base part of the magnetic shield 8 and the magnetic balancer 9 are disposed through-holes 82 and 92 for reducing stresses which affect the bottom surface of the chassis 1, in case of forming the magnetic shield 8, the magnetic balancer 9, and the chassis 1 by press clinching. These through-holes 82 and 92 may or may not be disposed.

Thus, by forming the magnetic balancer 9 to have a point symmetrical shape with the magnetic shield 8 to the rotation center 21 of the rotor 2, magnetic influence from the magnetic shield 8 to the rotor 2 is balanced, and the magnetic balance to the rotor 2 can be maintained in a symmetrical state to the rotation center 21.

As shown in FIG. 6, on the top ends 8b and 9b of the magnetic shield 8 and the magnetic balancer 9, are disposed protrusion type cartridge supporting parts 81 and 91, which are protruded upward from the top surface 26 of the magnet part 25 of the rotor 2. These cartridge supporting parts 81 and 91 are disposed to support in such a manner that, even when a disk cartridge such as a magnetic disk is thermally transformed, this disk cartridge does not contact with a rotating portion of the rotor 2. Accordingly, the top ends of the cartridge supporting parts 81 and 91 are set to be of a height such that a disk rotating operation of the rotor 2 is not blocked and the cartridge does not block the rotation of the rotor.

According to the above inner rotor motor, since the magnetic pole part 7 for cancelling the cogging torque is disposed around the rotor 2 via a magnetic interaction between this magnetic pole part 7 and the rotor 2, cogging torque of the motor can be canceled.

In particular, if a length of the magnetic pole part 7 along the outer peripheral surface 2a of the rotor 2 is set such that a difference between a phase of the cogging torque generated by the magnetic pole part 7 and the rotor 2, and a phase of the cogging torque generated in such a state that the magnetic pole part 7 is not mounted, is made to be, for example, about ±180°, an intrinsic cogging torque of the motor can be cancelled by the cogging torque generated by the magnetic pole part 7 and the rotor 2. Thus, it is possible to reduce the generation of the cogging torque by the entire motor.

Since the tip parts 33b to 38b of the magnetic teeth and the tip part 72 of the magnetic pole part 7 are disposed at positions from which are viewed the cutting parts 11 and 12 of the chassis 1, the magnetic fluxes from rotor 2 are applied only to the magnetic teeth 33 to 38 and the magnetic pole part 7 at portions where the magnetic teeth 33 to 38 and the magnetic pole part 7 are located and are not applied to the chassis 1. Therefore, the generation of the cogging torque due to the operation of the chassis 1 and the rotor 2 can be reduced.

Since the end face 75 of the ferromagnetic plate 71 is made to be of a curved surface along the outer peripheral surface 2a of the rotor 2, the magnetic fluxes from the rotor 2 to the ferromagnetic plate 71 can be effectively applied and cogging torque can be reduced.

Since the stator 3 is located at one side of the rotor 2, i.e., within an area where the center angle Q is within about 180° to a point 21 which coincides with the rotation center of the rotor 2, and more preferably, located within about 90°, as compared with a structure in which the stator is disposed on an entire circumference of the rotor like the related art inner rotor motor, an area of the stator core can be reduced to within an approximately half the value thereof. Therefore, manufacturing cost of the inner rotor motor can be reduced by reducing the cost of the stator core (made of for example, silicon steel) and the cost of windings of the coils.

At the same time, in the disk apparatus of the invention, compared with a case in which the stator is disposed on the entire circumference of the rotor, miniaturization can be accomplished by reducing an area required for mounting the motor and its weight can be reduced since the number of magnetic teeth can be reduced.

Since the magnetic pole part 7 functions as a magnetic balancer for maintaining the magnetic balance with the stator 3 to the rotor 2, even when stator 3 is formed only on one side of rotor 2 and rotor 2 is driven from the side, a force which is applied to rotor 2 can be made highly symmetrical and rotation driving stability of rotor 2 can be adequately maintained.

In particular, since the center position in a thickness direction of the rotor facing surface 35*d*, which is the tip of the magnetic teeth 35, and the center position in a thickness direction of the rotor facing surface 75, which is the end face of the ferromagnetic plate 71, are set to be an identical position in the rotation axis line direction of the rotor 2, rotor 2 is not inclined to the rotation axis line, and it is possible to stably rotate the rotor 2.

Figure 8:
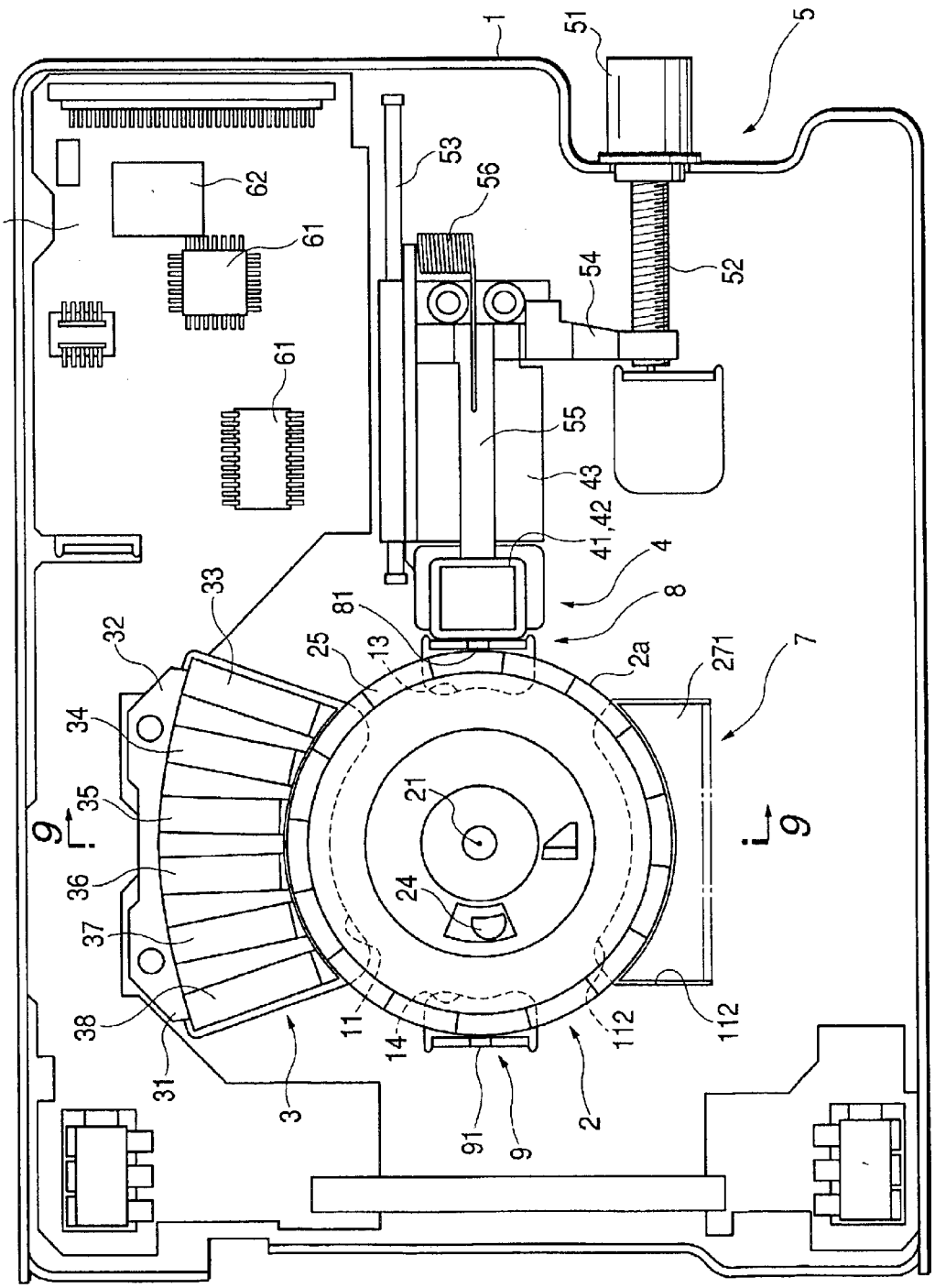
FIG. 8 is a second embodiment of the invention that shows a view of a disk apparatus that has an inner rotor motor.
Figure 9:
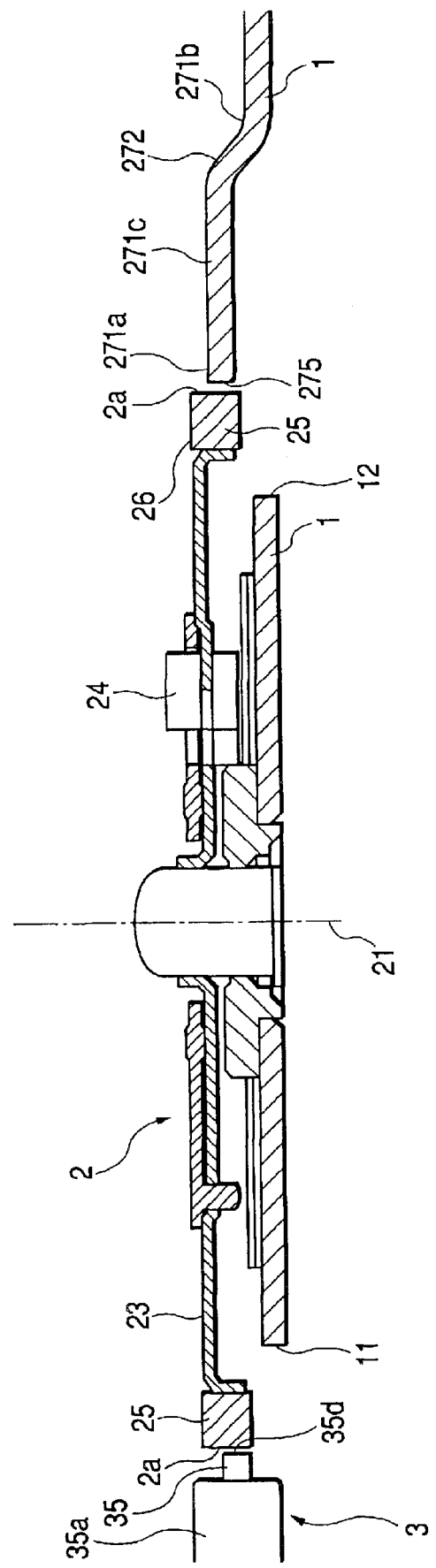
FIG. 9 is a sectional view showing 9—9 section of an inner rotor motor shown in FIG. 8.

FIG. 8 shows a view of a disk apparatus having an inner rotor motor which corresponds to a second embodiment of the invention. FIG. 9 shows a sectional view cut along line 9—9 of the inner rotor motor shown in FIG. 8.

For components shown in FIGS. 8 and 9, the same numerals are applied as those assigned to the same components shown in FIGS. 1 to 6.

A difference of the second embodiment from the first embodiment resides in that the magnetic pole part 7 for cancelling the cogging torque is changed from the ferromagnetic plate 71 to a ferromagnetic overhang mounted part 271.

As shown in FIGS. 8 and 9, the disk apparatus has a chassis (base) 1 which is made of a ferromagnetic material and forms part of a housing. On this chassis, as shown in FIG. 8, are disposed the rotor 2 and the stator 3 in an inner rotor motor (motor) for rotating a magnetic recording medium (disk), the magnetic head part 4 for reading and writing magnetic signals from and in the disk, the position control part 5 for carrying out position control of the magnetic head part 4, the substrate 6 as a control part for carrying out driving control of the position control part 5 and the inner rotor motor, the ferromagnetic overhang mounted part 71 as the magnetic pole part 7, the magnetic shield 8, and the magnetic balancer 9.

As shown in FIGS. 8 and 9, at a position opposite the stator by sandwiching the rotation center 21 of the rotor 2 is disposed the ferromagnetic overhang mounted part 271 which is the magnetic pole part 7 for cancelling the cogging torque.

The ferromagnetic overhang mounted part 271, as shown in FIGS. 8 and 9, is of a platy shape which is formed by cutting and raising a part of the chassis 1. A rear anchor side 271*a* of the ferromagnetic overhang mounted part 271 is connected to the chassis 1 through a step part 272. A tip part 271*b* thereof is positioned around the rotation position of the rotor 2 opposite the outer peripheral surface 2*a* of rotor 2.

Further, the ferromagnetic overhang mounted part 271 is picked up slightly from the chassis 1 by the step part 272 and aligned opposite the down side of the outer peripheral surface 2*a* of rotor 2 (magnet part 25).

Furthermore, by forming the ferromagnetic overhang mounted part 271, a cutting part 121 is disposed in the chassis 1, and the tip side 271*b* of the ferromagnetic overhang mounted part 271 is located at a position from which this cutting part is viewed.

Moreover, a rotor facing surface (end face) 275 disposed at the tip of the ferromagnetic overhang mounted part 271 is made to be a curved surface along the outer peripheral surface 2*a* of the rotor 2.

In particular, the rotor facing surface 275 is set to be of a circular or arch shape with a radius R1' such that it is of equal distance to point 21 which coincides with the rotation center of rotor 2. This radius R1' is set equal to or larger than radius R1 which is set to the rotor facing surfaces 33*d* to 38*d*.

Still further, a length in the circumferential direction of the rotor facing surface 275 of the ferromagnetic overhang mounted part 271 is set to a length such that the cogging torque generated when the rotor 2 is rotated is minimized.

Further, the tip side 271*b* of this ferromagnetic overhang mounted part 271 is located at a position lower than a center of the thickness of the rotor 2. In other words, a center position in a thickness direction of the rotor facing surface 275 is disposed at a position lower than a center position in a rotation axis direction of the magnet part 25 of the rotor 2. The height of this tip side 271*b*, i.e., a difference between the top surface 271*c* of the tip side 271*b* and the top surface 26 of the magnet part 25, is set such that, at the same time of setting a value of misalignment of height direction center positions of the tip parts 33*b* to 38*b* and the magnet part 25, a minimum and downward (to the chassis 1) thrust load is secured to maintain the rotation stability of rotor 2, and a load in radiating directions from the rotation center 21 of rotor 2 is enlarged.

The length in the circumferential direction of the rotor (facing surface 275 of the ferromagnetic overhang mounted part 271) is set such that it minimizes the cogging torque generated when the rotor 2 is rotated, in the same manner as in the ferromagnetic plate 71. A phase difference between a phase of the cogging torque generated by the magnetic pole part 7 and the rotor 2, and a phase of the cogging torque generated in such a state that the magnetic pole part 7 is not mounted, is set to fall within for example, approximately ±180°.

The reason for setting the parameters in this manner is the same as the reason as described in the first embodiment.

In addition, the ferromagnetic overhang mounted part 271, in the same manner as in the ferromagnetic plate 71, functions as a magnetic balancer for maintaining the magnetic balance with the stator 3. That is, by adjusting a position and a shape of the ferromagnetic overhang mounted part 271, the magnetic influence from the stator 3 to the rotor 2 is balanced, and the magnetic balance to the rotor 2 can be set to maintain a symmetrical state to the rotation center 21.

In particular, by setting a center position in a thickness direction of the rotor facing surface 35*d*, which is the tip of the magnetic teeth 35, and a center position in a thickness direction of the rotor facing surface 275, which is the end face of the ferromagnetic overhang mounted part 271, to be identical in the rotation axis direction of rotor 2, the rotor is not inclined to the rotation axis line so rotor 2 can be stably rotated.

According to the above inner rotor motor, the following advantages can be obtained other than those described in the first embodiment. By simply cutting and raising a part of the chassis 1, the ferromagnetic overhang mounted part 271 can be formed. Therefore, it is unnecessary to mount new members so the number of components and the manufacturing cost of the inner rotor motors can be reduced.

Figure 10:
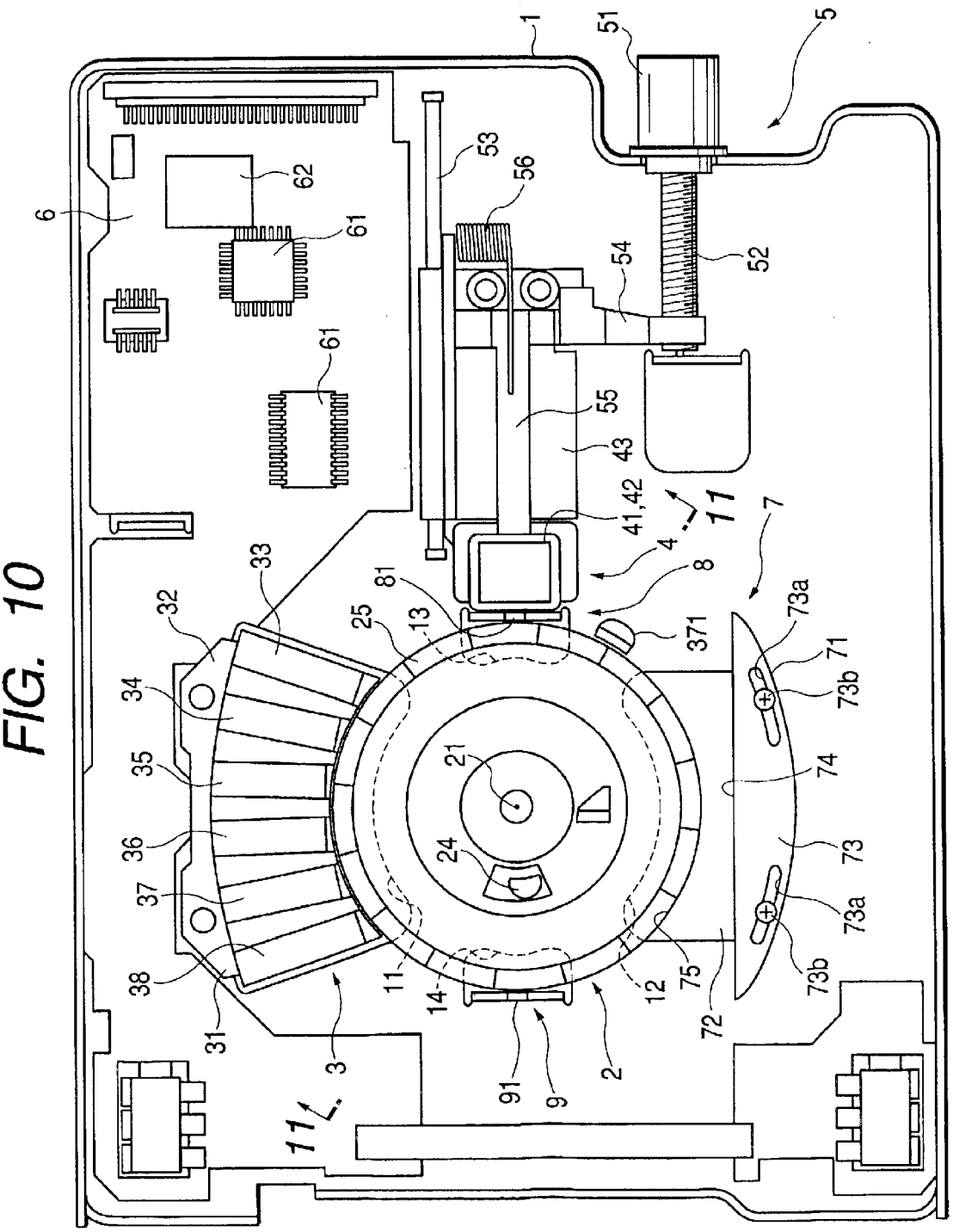
FIG. 10 is a third embodiment of the invention showing a view of a disk apparatus that has an inner rotor motor.
Figure 11:
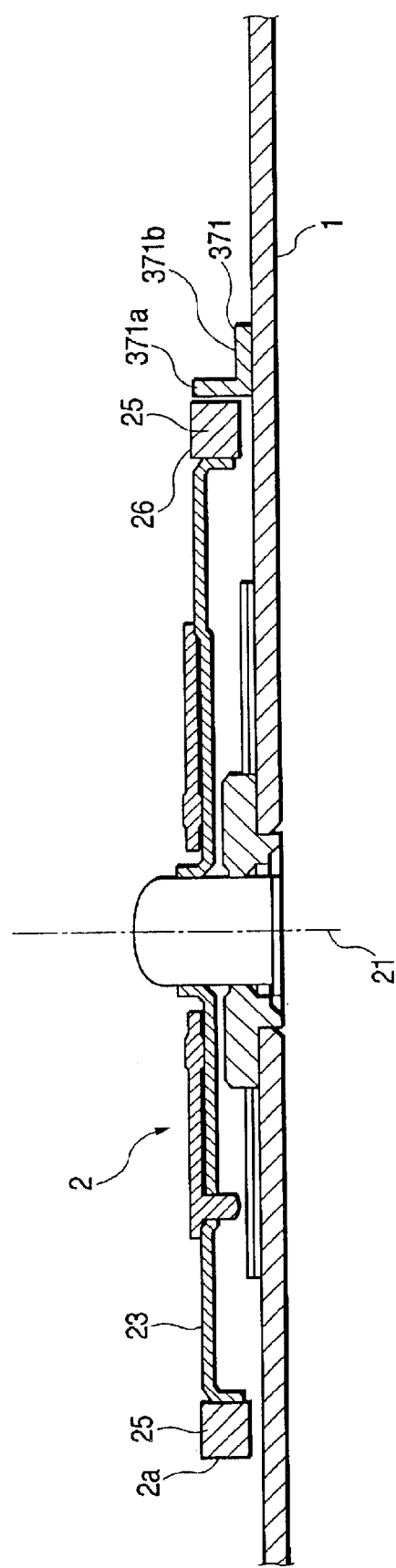
FIG. 11 is a sectional view showing 11—11 section of an inner rotor motor shown in FIG. 10.

FIG. 10 shows a view of a disk apparatus having an inner rotor motor, which corresponds to a third embodiment of the invention. FIG. 11 shows a sectional view cut along line 11—11 of the inner rotor motor in FIG. 10.

For the components shown in FIGS. 10 and 11, the same numerals are applied to as those assigned the same components shown in FIGS. 1 to 6.

A difference of the third embodiment from the first embodiment is that an auxiliary plate 371 is added in addition to the ferromagnetic plate 71 as the magnetic pole part 7 for canceling the cogging torque.

As shown in FIGS. 10 and 11, the disk apparatus has chassis (base) 1, which is made of a ferromagnetic material and which forms part of a housing. On this chassis, as shown in FIG. 8, are disposed rotor 2 and stator 3 in an inner rotor motor (motor) for rotating a magnetic recording medium (disk), the magnetic head part 4 for reading and writing magnetic signals from and in the disk, the position control part 5 for carrying out position control of the magnetic head part 4, the substrate 6 as a control part for carrying out driving control of the position control part 5 and the inner rotor motor, the ferromagnetic plate 71 and the auxiliary 371 as the magnetic pole part 7, the magnetic shield 8, and the magnetic balancer 9.

As shown in FIGS. 10 and 11, at a position opposite the stator by sandwiching the rotation center 21 of rotor 2 is disposed the ferromagnetic plate 71 which is the magnetic pole part 7 for cancelling the cogging torque.

At the outer peripheral side of rotor 2 between the ferromagnetic plate 71 and the magnetic shield 8 is disposed the auxiliary plate 371 which is made of a ferromagnetic material.

The auxiliary plate 371 is, as shown in FIG. 11, a member of an L-shape structure in its section, a rear anchor part 371b thereof is welded on the chassis 1, and a tip part 371a thereof is disposed around the rotation position of rotor 2 opposite the outer circumference surface 2a of rotor 2 (magnet part 25).

A length of the auxiliary plate 371 along a rotation direction of the rotor 2 is set shorter than that of the magnetic poles 25n and 25s of the magnet part 25 in FIG. 10, but the invention is not limited to this. The length may be equal to or larger than the length of the magnetic poles 25n and 25s.

By adding the auxiliary plate 371, the cogging torque pattern by the auxiliary plate 371 and the rotor 2 can be added in addition to the two cogging torque patterns shown in FIG. 7. Also, the cogging torque of the entire motor can be made closer to a standing wave so the cogging torque can be further reduced.

Figure 12:
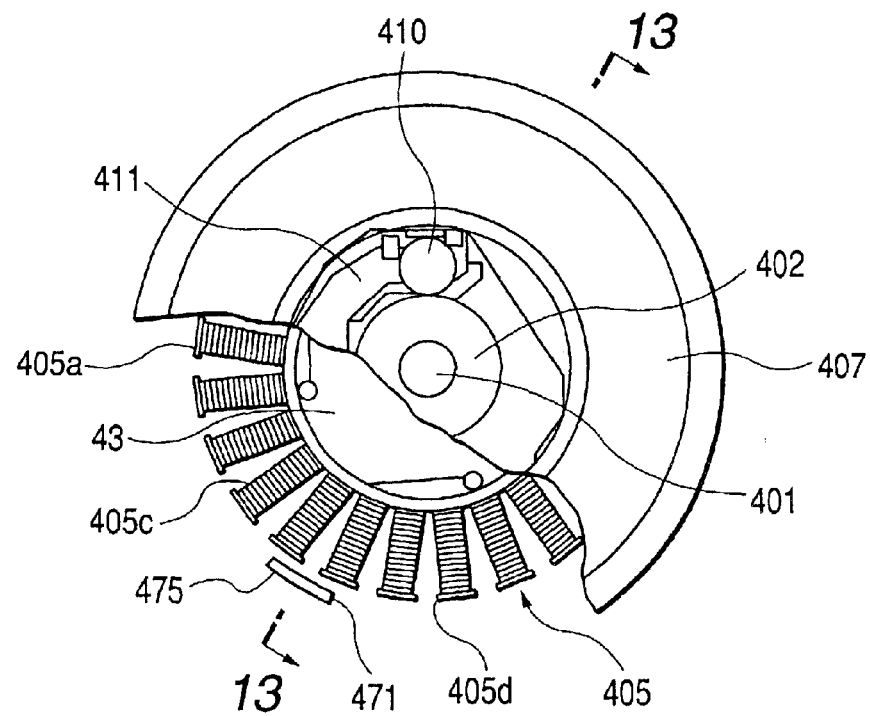
FIG. 12 is a view of a motor that corresponds to a fourth embodiment of the invention.

FIG. 12 shows a view of a motor which corresponds to a fourth embodiment of the invention.

Figure 13:
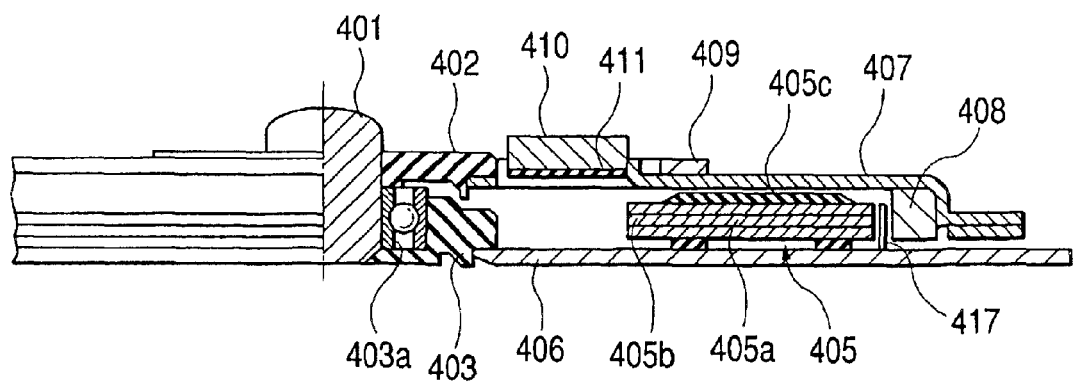
FIG. 13 is a sectional view showing 13—13 section of an inner rotor motor shown in FIG. 12.
Figure 14:
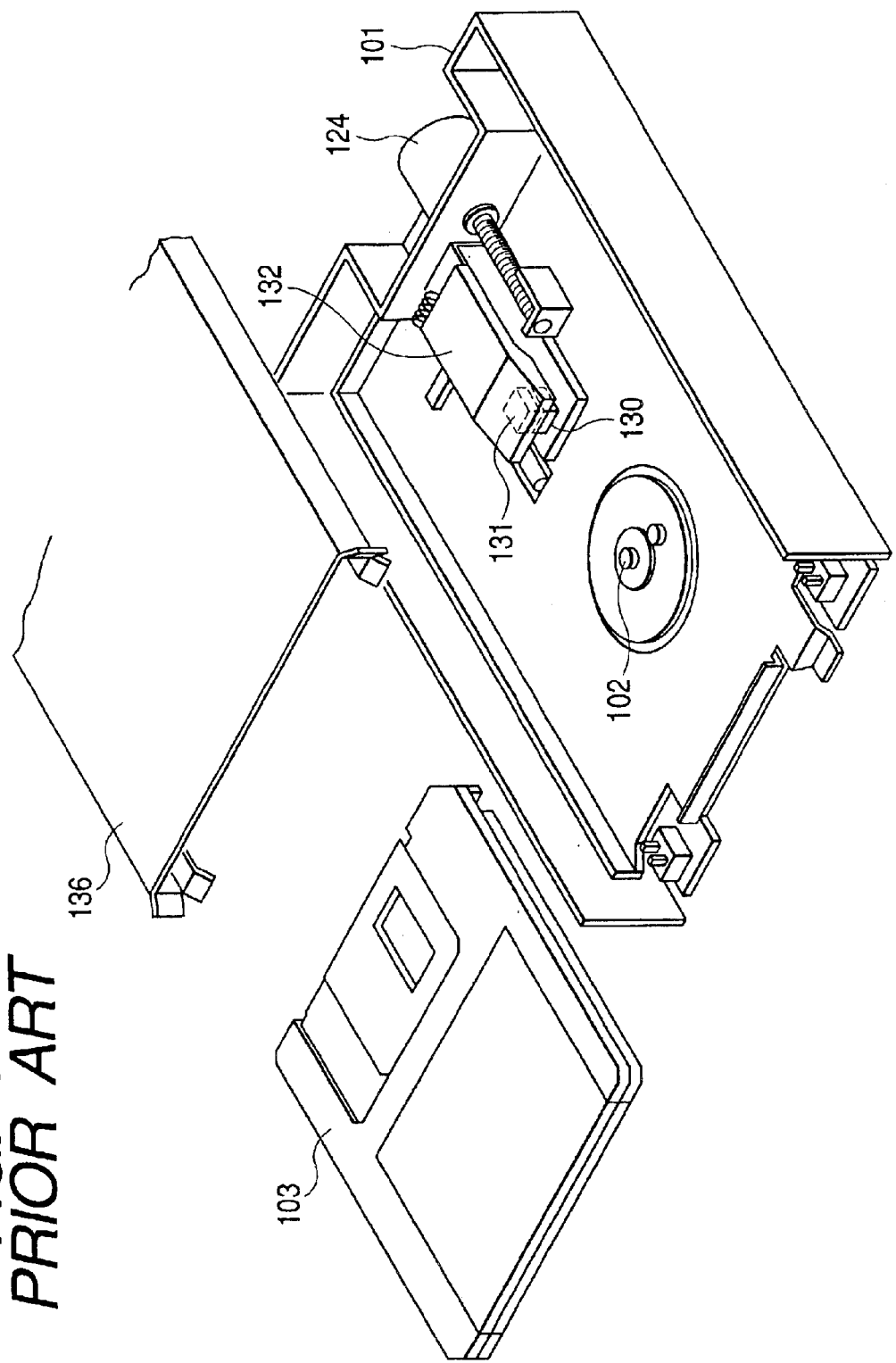
FIG. 14 is a patterned oblique perspective view showing a disk apparatus in the related art.
Figure 15A:
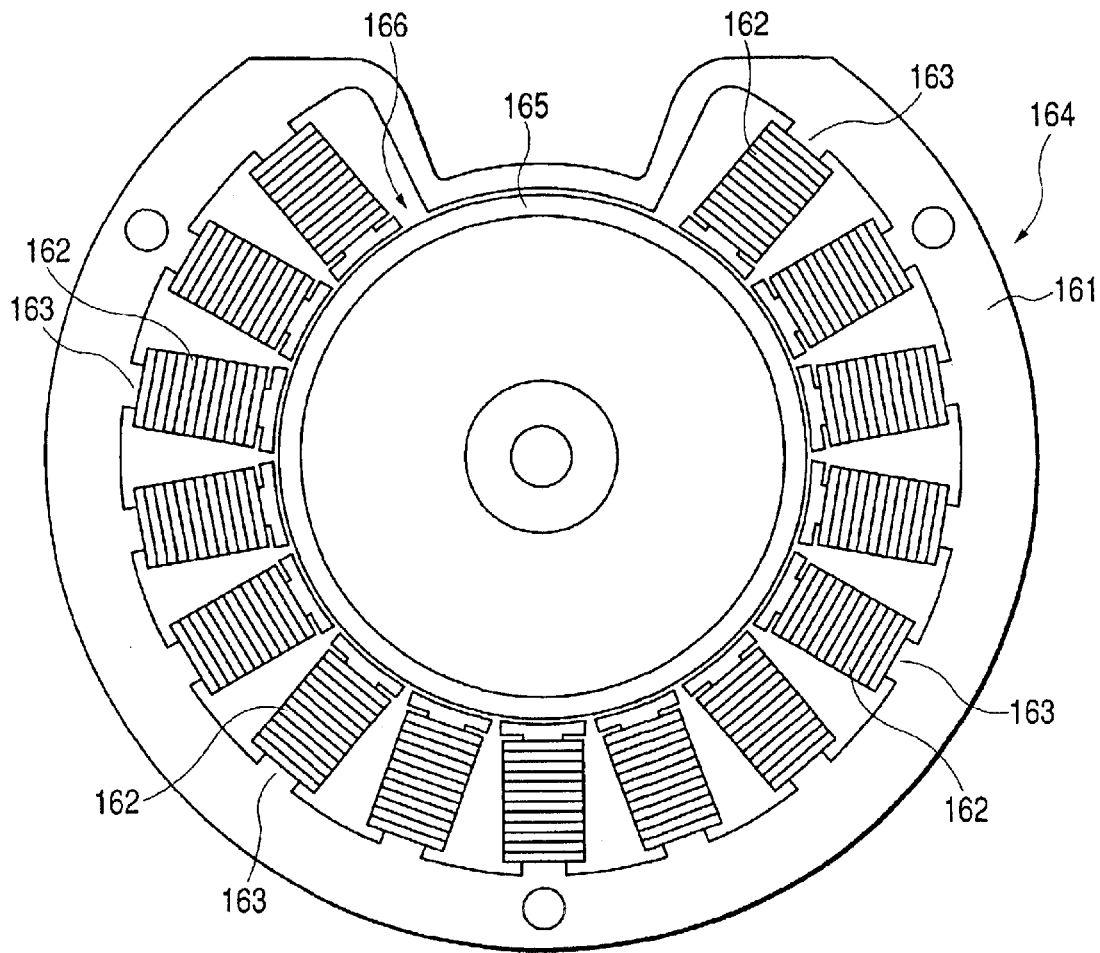
FIG. 15A is a view showing an inner rotor motor in the related art.
Figure 15B:
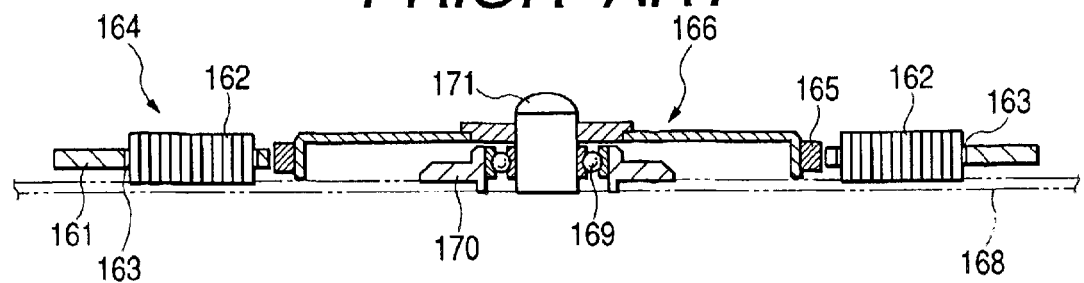
FIG. 15B is a sectional view showing the inner rotor motor in the related art.
Figure 16:
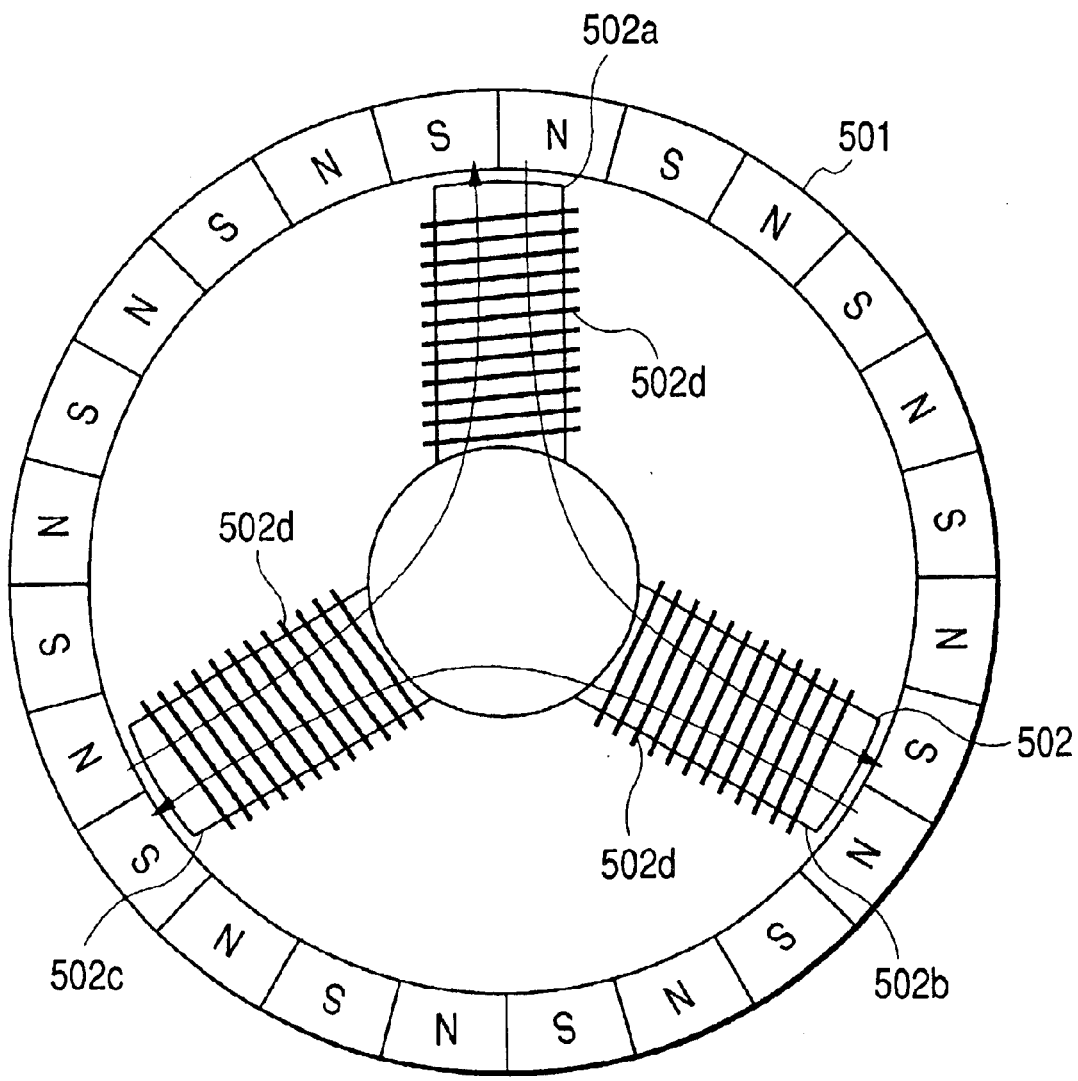
FIG. 16 is a view showing a motor in the related art.

FIG. 13 is a sectional view cut along line 13—13 of FIG. 12.

The motor of FIG. 12 has a structure in which a stator 405 is located at an inner peripheral side of a circular magnet 408. As shown in FIGS. 12 and 13, the motor is composed of a rotation axis 401, a stator 405 in which coils 405c, . . . are wound on respective magnetic teeth 405a, . . . of the stator core 405b having a plurality of magnetic teeth 405a, . . . arranged in a radial pattern, a circular magnet 408 located at an outer peripheral side of the stator 405, and a ferromagnetic plate 471 as the magnetic pole part 7.

The rotation axis 401 is bonded to a circular disk 402. A bearing part 403a is disposed to the rotation axis 401, which is held by a bearing 404 held by a housing 403. The rotation axis 401 is made to be rotatable to the housing 403 which is fixed to a substrate 406 by caulking.

Coils 405c, . . . are wound on the respective magnetic teeth 405a, . . . , respectively, and the coil 405c is bonded by adhesion to the substrate 406. The tips 405d, . . . of the respective magnetic teeth 405a, . . . are aligned opposite the inner peripheral surface of the magnet 408.

Rotor frame 407 is fixed to the circular disk 402 and holds the circular magnet 408. Magnet 409 is for absorbing a medium; it absorbs a disk (not shown) to fix it on the circular disk 402. Driving pin 410 is fixed to a leaf spring to chuck a disk.

The ferromagnetic plate 471 as the magnetic pole part 7 is located between the inner peripheral surface of the magnet 408 and the tip 405d of the stator 405.

A magnetic facing surface (end face) 475 located at the tip of the ferromagnetic plate 471 is made to be a curved surface along the outer peripheral surface 402a of the rotor 402. Further, the length in a circumferential direction of the magnet facing surface 475 of the ferromagnetic plate 471 is set to minimize the cogging torque generated when the rotor 402 is rotated.

Further, the ferromagnetic plate 471 is located at a position lower than a center of the thickness of the magnet 408. In other words, a center position in a thickness direction of the rotor facing surface 475 is disposed at a position lower than a center position in a rotation axis direction of the magnet 408. By disposing the ferromagnetic plate 471 at the lower position to the magnet 408, it is set such that a minimum and downward (to the substrate 6) thrust load is secured to maintain the rotation stability of the rotor frame 407 including the magnet 408, and a load in radiating directions from the rotation axis 401 is increases.

The length in the circumferential direction of the magnet facing surface 475 of the ferromagnetic plate 471 is set to minimize the cogging torque generated when the rotor frame 407 is rotated, in the same manner as in the ferromagnetic plate 71. A phase difference between a phase of the cogging torque generated by the magnetic pole part 7 and the magnet 408, and a phase of the cogging torque generated in such a state that the magnetic pole part 7 is not mounted, is set to fall within, for example, approximately ±180°. The reason the length is set in this manner is the same as the reason described in the first embodiment.

By disposing the ferromagnetic plate 471, the cogging torque of the entire motor is made closer to a standing wave so cogging torque can be reduced.

As described above in detail, according to the motor of the invention, since a magnetic pole part for cancelling the cogging torque is disposed around a rotor or between the rotor and a stator, the cogging torque of the motor can be cancelled by a magnetic interaction between this magnetic pole part and the rotor. Thus, it is possible to prevent the decrease of the rotor torque, to reduce the rotation irregularity of the rotor, and to reduce control currents of the motor.

Since the width of a magnetic pole part is set up such that a phase difference the phase of the cogging torque generated by the magnetic pole part and the rotor, and the phase of the cogging torque generated in such a state that the magnetic pole part is not mounted, falls within a certain range, the original cogging torque of the motor can be cancelled by the cogging torque generated by the magnetic pole and the rotor. Thus, the cogging torque can be reduced.

What is claimed is:

1. A motor comprising a rotor having a plurality of magnetic poles disposed in an arch shape and a stator in which coils are disposed on magnetic teeth of a stator core having a plurality of the magnetic teeth disposed opposite the rotor, wherein the magnetic teeth are oriented nonparallel to each other and wherein a magnetic pole part, being formed separately from the stator, is disposed around the rotor, the magnetic pole part further comprising an adjustable ferromagnetic plate having a tip part located at a position lower than a center of thickness of the rotor.

* * * * *